United States Patent [19]

Mouterde et al.

[11] Patent Number: 5,695,207
[45] Date of Patent: Dec. 9, 1997

[54] MOTORIZED BREAKDOWN VEHICLE, IN PARTICULAR FOR A TANK

[75] Inventors: Renaud Mouterde, La Chesnay; Bernard Timmer, Conflans Sainte Honorine; Erick Thuillier, Guyancourt, all of France

[73] Assignee: Giat Industries, Versailles, France

[21] Appl. No.: 500,246

[22] Filed: Jul. 10, 1995

[30] Foreign Application Priority Data

Jul. 18, 1994 [FR] France .................... 94 08844

[51] Int. Cl.⁶ ........................................ B60R 3/02
[52] U.S. Cl. ........................................ 280/163
[58] Field of Search ................... 280/163, 164.1, 280/165, 166; 105/443, 444, 445, 447, 448, 450; 296/62; 182/77, 84, 86, 127; 14/71.1

[56] References Cited

U.S. PATENT DOCUMENTS

| | | | |
|---|---|---|---|
| 2,481,230 | 9/1949 | MacDonald, Jr. | 296/62 |
| 3,176,334 | 4/1965 | Lovdahl | 14/71.1 |
| 3,853,369 | 12/1974 | Holden | 296/62 |
| 3,997,211 | 12/1976 | Graves | 280/163 |
| 4,264,084 | 4/1981 | Telles | 280/166 |
| 4,846,487 | 7/1989 | Criley | 280/166 |
| 4,907,673 | 3/1990 | Ginter et al. | 182/84 |
| 5,039,119 | 8/1991 | Baughman | 280/166 |
| 5,205,603 | 4/1993 | Burdette, Jr. | 296/62 |

FOREIGN PATENT DOCUMENTS

| | | | |
|---|---|---|---|
| 2 545 427 | 11/1984 | France . | |
| 93 09603 | 2/1995 | France . | |
| 39542 | 3/1983 | Japan | 280/163 |
| 628896 | 5/1947 | United Kingdom . | |

*Primary Examiner*—Eric D. Culbreth
*Assistant Examiner*—Frank Vanaman
*Attorney, Agent, or Firm*—Oliff & Berridge

[57] ABSTRACT

A motorized breakdown vehicle for an armored vehicle such as a tank includes a chassis that supports a platform having a gangway and a ladder for climbing to the platform. The ladder and gangway are hinged to the platform around a common hinge pin and are selectively connected to one another by a releasable locking structure such that the gangway and the ladder are integral with one another during transport and are independently maneuverable during maintenance.

17 Claims, 5 Drawing Sheets

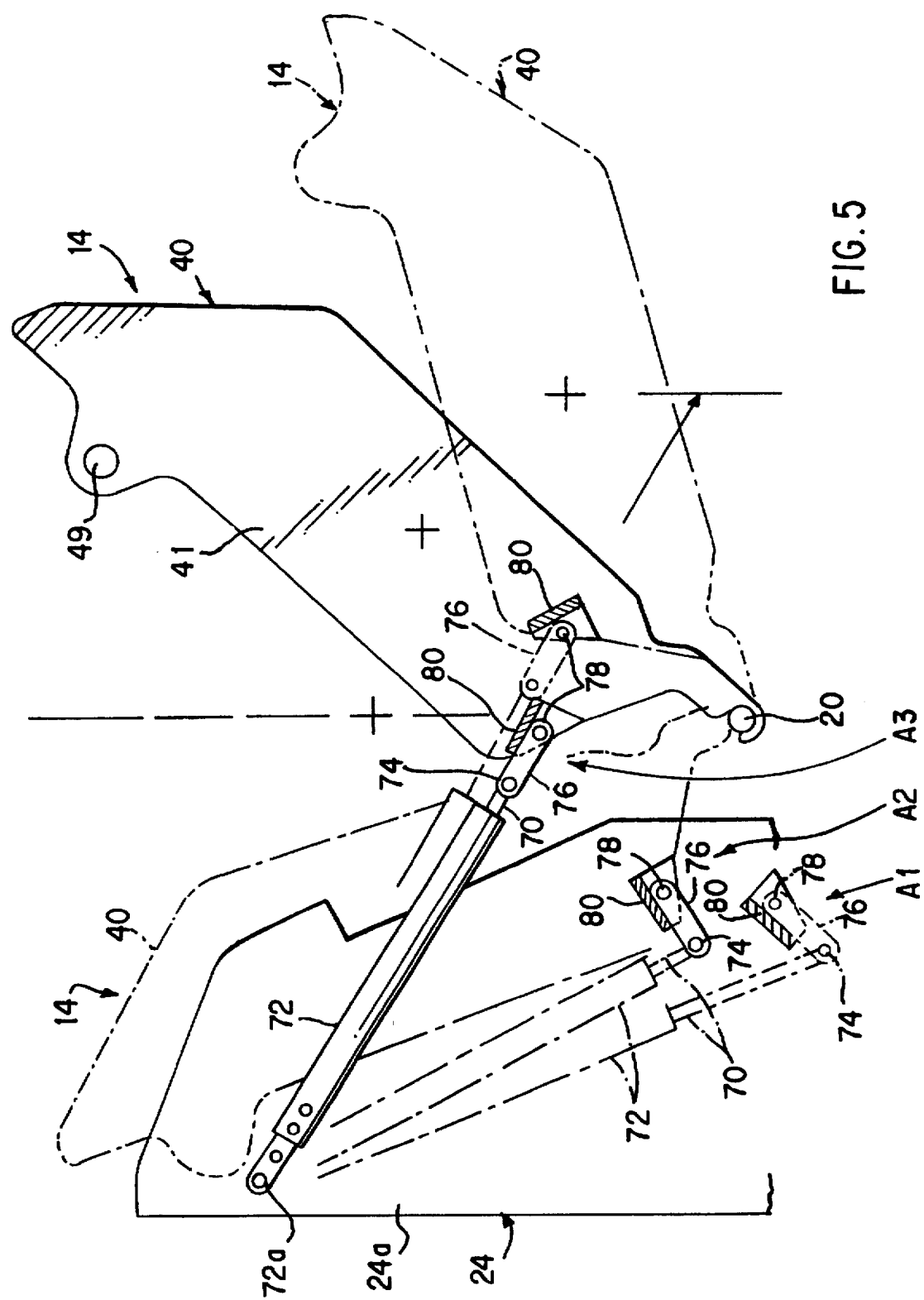

5,695,207

MOTORIZED BREAKDOWN VEHICLE, IN PARTICULAR FOR A TANK

BACKGROUND OF THE INVENTION

The present invention relates to improvements made to a motorized breakdown vehicle which is fitted out so as to carry out preventive and/or reparative maintenance operations on an armored vehicle such as a tank, for example, comprising a chassis bearing a platform arranged to accommodate the necessary equipment for maintenance, reparation and/or supply operations, the arrangement of this platform also comprising a gangway associated with a ladder to accede to the platform, the gangway being hinged to the platform between a raised position or a roughly vertical transport position and a lowered position or a roughly horizontal maintenance position.

The maneuvering conditions of a tank in combat or during maneuver exercises are generally very harsh, notably when the terrain is rugged, stony and/or sandy, to which climatic conditions, which are not necessarily favorable, need to be added. Despite the reliability of these vehicles and their associated equipment, breakdowns are always possible, amongst which those which lead to the immobilization of the vehicle such as, for example, the failure of the engine, the gear systems, the tracks, etc. Naturally, to these accidental breakdowns must be added, when the tank is in combat, those resulting from damage caused by the explosion or an anti-tank weapon or of a mine, for example.

When a tank is immobilized, a first intervention may be envisaged on the spot employing certain of the tools carried on-board. However, these tools are limited and the repair operations of the tank may prove impossible, notably through the lack of spare parts. A second intervention may also be envisaged on the spot by calling on a breakdown vehicle which may carry more equipment on-board, notably spare parts. Lastly, a third intervention may be envisaged by calling on a pick-up vehicle to evacuate the tank, always supposing that such a vehicle has access to the zone where the tank is immobilized.

Taken together, there are many intervention possibilities to repair a tank, but they are ill-assorted and often take a long time to implement thereby damaging their effectiveness.

In document FR-93 09603, which is assigned to the present assignee, now French Patent 2 708 536, a motorized breakdown vehicle is described as having an increased efficiency, thanks to a structure and to fittings which are better adapted to the vehicles which it is designed to maintain and/or repair, taking into account notably the requirements formulated by the users. In this document, the breakdown vehicle comprises a chassis bearing a removable platform of a modular design comprising supports to accommodate the required equipment for the maintenance, reparation and/or supply operations. At least certain of these supports are being moveable on the platform to give free access to different parts of the propulsion system of the vehicle. The platform is also fitted with a gangway which is hinged between a raised position or a roughly vertical transport position and a lowered or roughly horizontal maintenance position, to which a ladder to accede to the platform is associated.

SUMMARY OF THE INVENTION

One aim of the invention is to improve such a platform, notably regarding the more functional integration of the ladder with the gangway.

To this end, the invention proposes a motorized breakdown vehicle of the afore-mentioned type which is characterised in that the gangway and the ladder are hinged around a same axle and are connected to one another by removable locking structure such that the gangway and the ladder are made integral with one another in order to be moved simultaneously by a control device when the locking structure is in operation, and such that the gangway and the ladder are separated from one another when the locking structure is no longer in operation, in order to be able to maneuver the ladder independently from the gangway.

According to a preferential embodiment of the invention, the gangway may be split into two elements, integral with one another, the ladder being set between the two elements of the gangway.

According to another aspect of the invention, the control device used to lower or raise the gangway may include a single jack, of the hydraulic type for example, wherein the body is hinged on the platform and the piston rod is hinged onto one of the two elements of the gangway.

Each element of the gangway may, with advantage, be connected to the platform by at least one restraining device to limit the angular clearance of the gangway when it is lowered to its maintenance position. In practice, the removable locking structure provided between the gangway and the ladder includes two retractable pins borne by the ladder and two clasps fitted on the two lateral adjacent sides of the two elements of the gangway, these two retractable pins being connected by a cable to at least one control handle to be able to retract the two locking pins simultaneously thereby separating the ladder and the gangway from one another.

As a general rule, the ladder may include a first part or body mounted swivelling on the hinge pin of the gangway between a raised or transport position and a lowered or maintenance position, and a second part hinged on the body and able to be folded down onto the body.

The body of the ladder may, with advantage, be connected to the platform by at least one restraining device to limit the angular clearance of the body when the ladder is lowered towards its maintenance position, and by a equalizing spring working in traction to facilitate manipulation of the ladder.

As a general rule, the ladder and the gangway may be lowered simultaneously by the control jack until the gangway reaches its roughly horizontal maintenance position, whereas the body of the ladder has not completely swung over. Thereafter an operator on the ground separates the ladder from the gangway using the handle in order to allow the body of the ladder to tip over fully. Lastly, the operator unfolds the second part of the ladder until nearly touching the ground.

According to another mode of operation, the gangway may be maintained in its raised position and only the ladder may be lowered. For this, the operator acts on the handle to separate the ladder and the gangway from one another and to tip over the body of the ladder and the second part of the ladder.

According to one advantage of the invention, the gangway and the ladder may work together functionally and are perfectly integrated into the platform.

In particular, when the gangway and the ladder are raised in the transport position, the ladder is folded down onto the platform and an end wall of the body of the ladder takes up a vertical position in alignment with the two elements of the gangway, and when the gangway and the ladder are lowered in the maintenance position, one end wall of the body of the ladder is roughly in alignment with the two elements of the gangway.

3

BRIEF DESCRIPTION OF THE DRAWINGS

Other advantages, characteristics and details of the invention will emerge from the explanatory description which will follow made in reference to the appended drawings, given by way of example and wherein:

FIG. 5 is a skeleton view of a spring device working with the ladder so as to facilitate its tipping over.

DETAILED DESCRIPTION OF PREFERRED EMBODIMENTS

Figure 1:
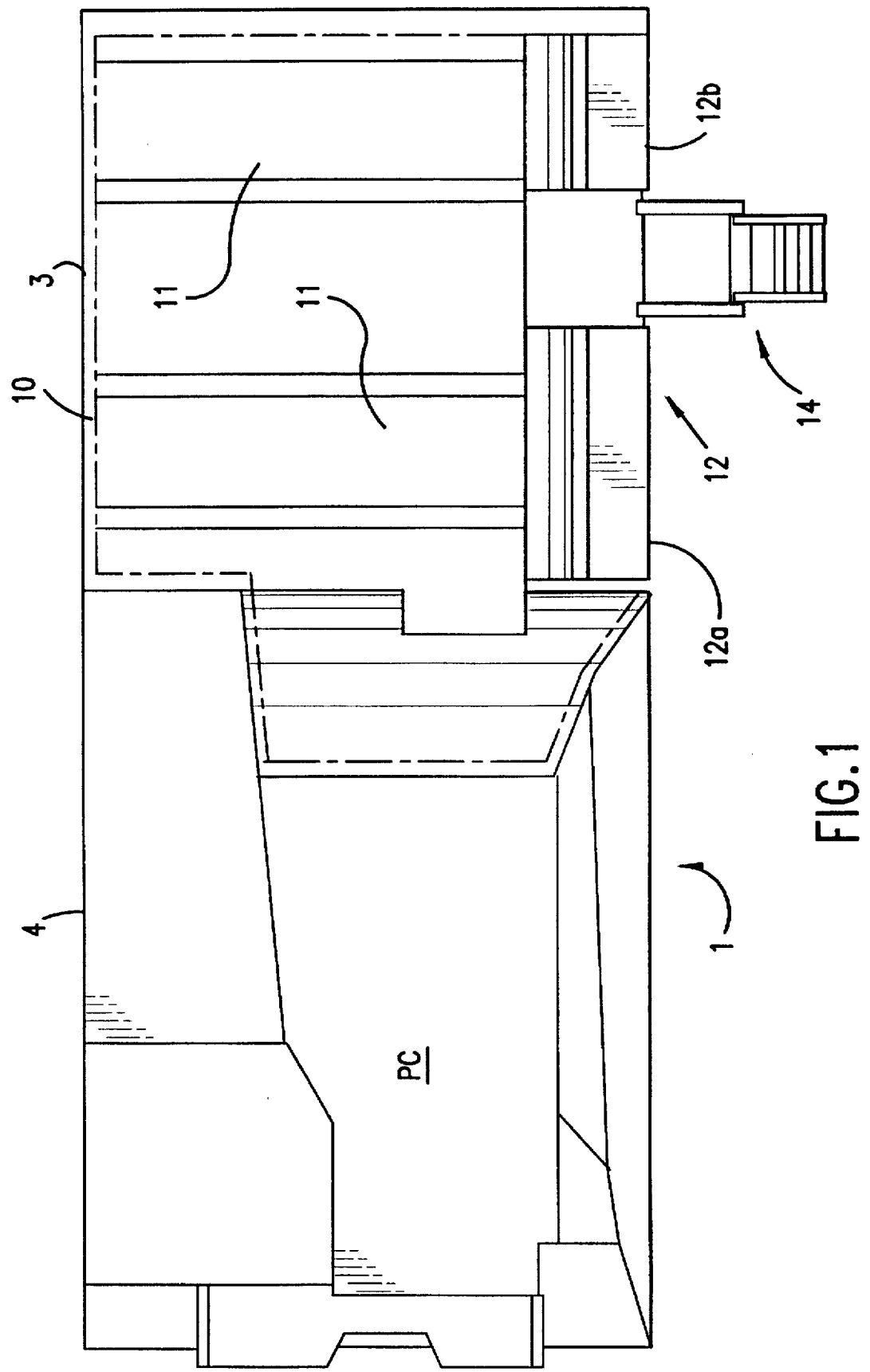
FIG. 1 is a top skeleton view of a motorized vehicle according to the invention.

In FIG. 1, reference 1 designates a motorized breakdown vehicle comprising a chassis which may be split into two parts, respectively the rear 3 and the front 4. The breakdown vehicle 1 is propelled by an engine housed in the rear chassis 3, whereas a crew cabin and command post (PC) are arranged on the front chassis 4, for example.

The breakdown vehicle 1 is fitted with a platform 10 which is mounted on the rear chassis 3. As a general rule, this platform 10 is equipped so as to be able to support a certain quantity of equipment such as storage containers or cases 11, different appliances, spare parts, etc. and it comprises at least one gangway 12 to facilitate movement around the platform 10 and a ladder 14 to reach the platform 10 from the ground.

The gangway 12 extends roughly along one longitudinal side of the platform 10 and is mounted swivelling around an axis X—X between a roughly vertical raised or transport position and a roughly horizontal lowered or maintenance position.

Figure 2:
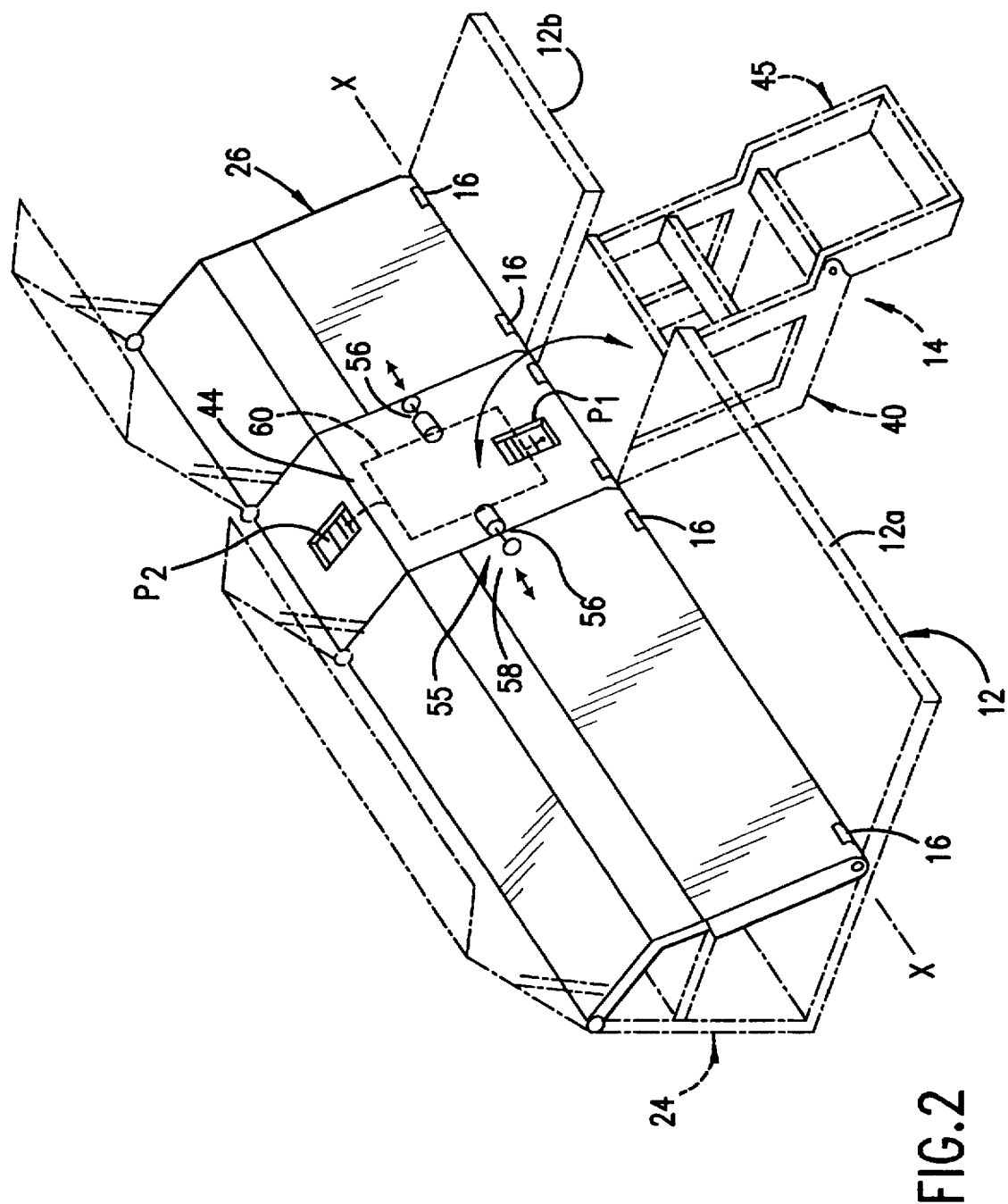
FIG. 2 is a partial perspective view of a gangway and a ladder, these two elements being part of the equipment of the vehicle shown in FIG. 1.
Figure 3:
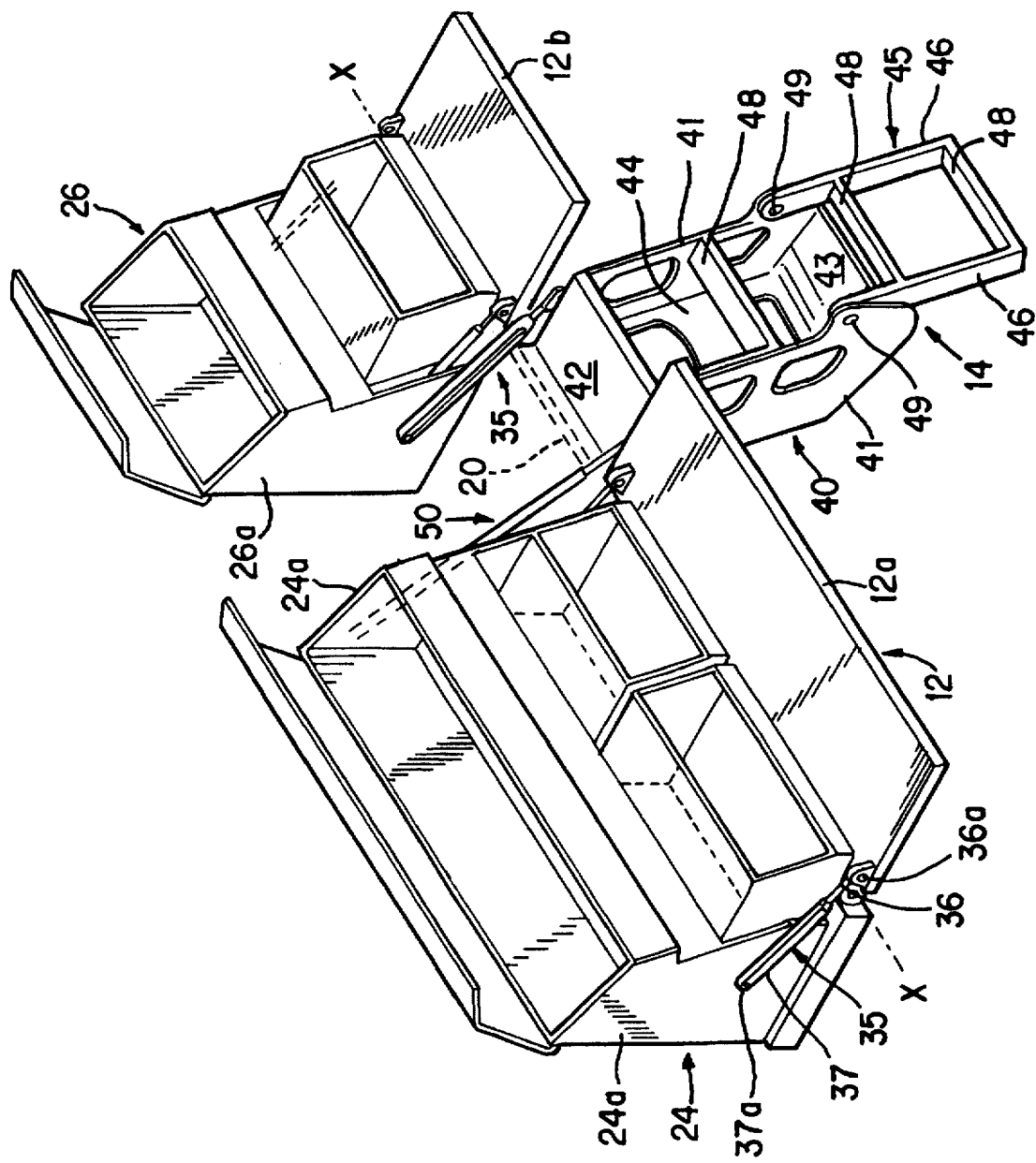
FIG. 3 is a partial perspective view which shows the gangway and the ladder in a lowered or maintenance position.
Figure 4:
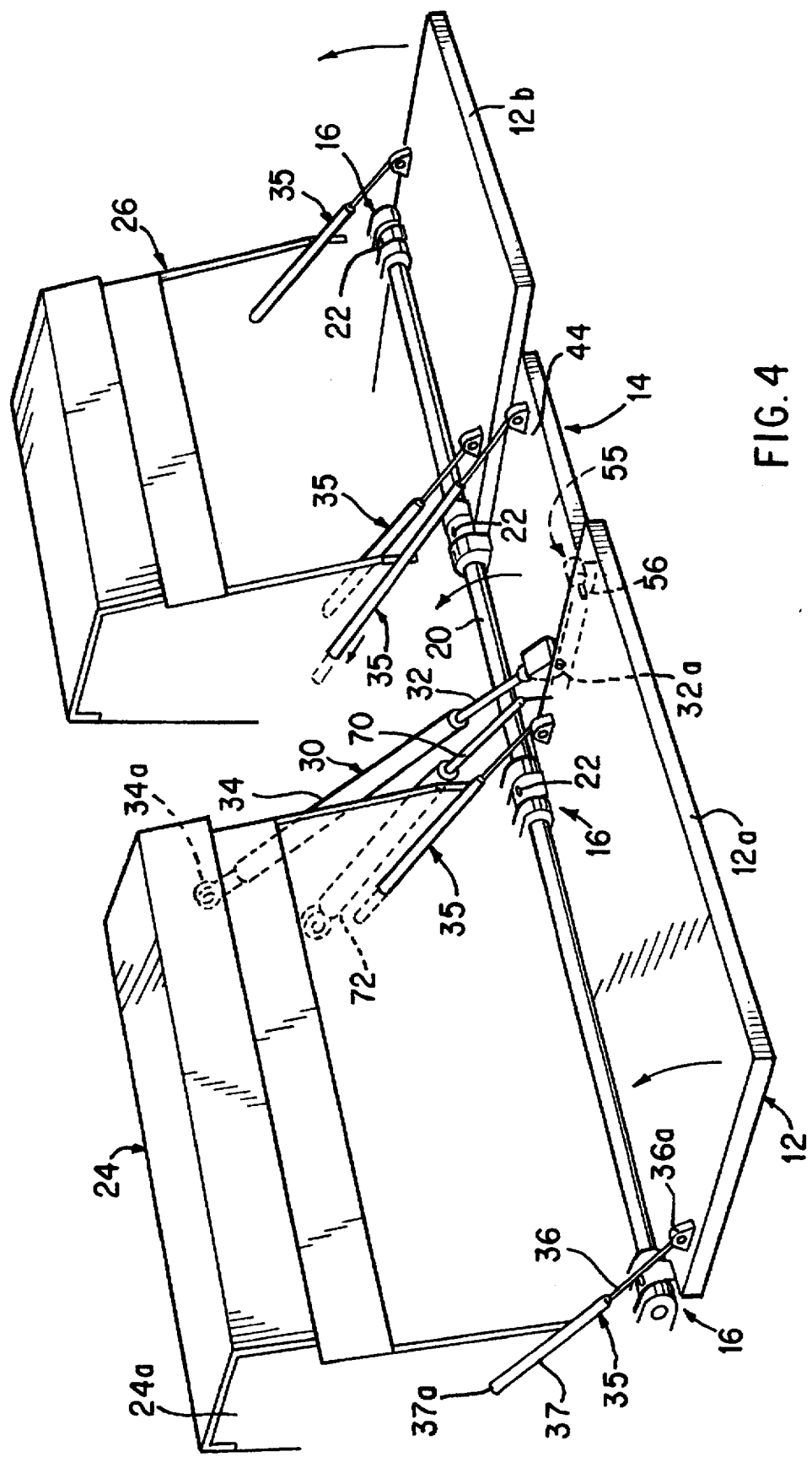
FIG. 4 is a partial perspective view to illustrations the different articulations of the control devices mounted between the platform, the gangway and the ladder.

According to a preferential embodiment illustrated in FIGS. 2 to 4, the gangway 12 is split into two elements 12a and 12b with the ladder 14 being placed in between these two elements 12a and 12b.

Each element of the gangway 12a and 12b is mounted swivelling on the platform 10 by means of at least two hinges 16 separated from one another and located along the hinge axis X—X (FIG. 2). This axis X—X is manifested in FIG. 4 by a bearing shaft 20 which is made integral with the two elements of the gangway 12a and 12b by means of pins 22 located on the hinges 16, for example. Thus, the two elements of the gangway 12a and 12b are made integral with the another in order to be able to be controlled simultaneously towards a raised or lowered position.

The gangway element 12a may, in an advantageous manner, constitute the outer longitudinal wall of a storage container 24 fitted along the platform 10, and the gangway element 12b may constitute the outer longitudinal wall of a storage container 26 also fitted along the platform 10. In these circumstances, the ladder 14 is located in the gap on the platform 10 which separates the two storage containers 24 and 26. The two gangway elements 12a and 12b are simultaneously controlled towards the raised or lowered position by means of a single control means 30 formed by

4 a jack shown in FIG. 4, of the hydraulic type for example. The piston rod 32 of this jack is hinged at 32a on the gangway element 12a, the hinge point 32a being located at a distance from the bearing shaft 20, whereas the body 34 of the jack is hinged at 34a on a lateral wall of the storage container 24, for example.

The angular clearance of each gangway element 12a and 12b is limited by two restraining devices 35 separated from one another and both located in a parallel plane to that of the control jack 30. Both restraining devices 35 are for example formed of a telescopic type torque link shown in FIGS. 3 and 4, whereof an element 36 is hinged at 36a on the respective gangway element 12a and 12b, and whereof the other element 37 is hinged at 37a on one of the lateral walls 24a of the respective storage container 24 or 26.

The ladder 14 (FIG. 3) is also mounted swivelling on the bearing shaft 20 between a raised position where it is folded down on the platform 10 and a lowered or maintenance position. The ladder 14 is constituted from a first part or body 40 in the form of a hollow coffer comprising two lateral walls 41 hinged on the shaft 20, two end walls 42 and 43. A bottom wall 44, and a second part 45 is hingably mounted and able to be folded down on the body 40. The second part 45 of the ladder 14 is formed by two posts 46 parallel to the two lateral walls 41 of the body 40 and linked together by rungs 48. At one end, the two posts 46 are respectively hinged at two points 49 on the two lateral walls 41 of the body 40. At least one additional rung 48 is provided between the two lateral walls 41 of the body 40 of the ladder 14.

With further reference to FIG. 3, the body 40 of the ladder 14 also works in conjunction with at least one restraining device 35 to limit the angular clearance of the body 40 of the ladder 14 when the ladder is lowered towards is maintenance position. In addition, the ladder 14 works in conjunction with an equalizing spring 50 according to an assembly which will be described later with reference to FIG. 5.

Lastly, the body 40 of the ladder 14 bears removable locking means 55 which enables the ladder 14 to be made integral with the two elements of the gangway 12a and 12b in circumstances which will be described later.

The removable locking means 55 is shown in skeleton form in FIG. 2 is formed of two retractable pins 56 projecting from the outer faces of the two lateral walls 41 of the body 40 of the ladder 14, and by two clasps 58 arranged on the two lateral sides of the gangway elements 12a and 12b which lie adjacent to the ladder 14.

Each pin 56 is connected to at least one and preferably to two lower P1 and higher P2 control handles by cables 60, such that by acting on one or other of these handles P1 and P2 results in the simultaneous retraction of the two pins 56, notably when the latter are engaged in their respective clasps 58 in order to be able to separate the ladder 14 and the gangway 12 from one another. These two superimposed handles P1 and P2 are supported by the bottom wall 44 of the ladder 14 and are accessible from the outside.

When the ladder 14 (FIG. 2) is folded and the gangway 12 is in its roughly vertical or transport position, the ladder 14 is housed in the gap between the two storage containers 24 and 26, such that its bottom wall 44 and the two gangway elements 12a and 12b of the gangway are roughly coplanar, in such a manner that the whole assembly be perfectly integrated into the rear chassis 3 of the breakdown vehicle 1.

When the breakdown vehicle has reached the area where it is to perform its intervention, the gangway 12 may be lowered into its roughly horizontal maintenance position by acting on the jack 30 controlled from the crew cabin and control post (PC) and, preferably, from an outside control accessible to an operator on the ground, for safety reasons.

The two gangway elements 12a and 12b are thus lowered simultaneously by swivelling around the hinge pin X—X. The angular clearance of the two gangway elements 12a and 12b is limited by restraining devices 35 which reach their maximum length when the two gangway elements 12a and 12b have reached a roughly horizontal position located roughly in line with the platform 10 (FIGS. 3 and 4).

When the ladder 14 is folded or is in its storage position (FIG. 2) and no action is exerted on the handles P1 and P2, the ladder 14 is integral by means of the locking pins 56 with the two gangway elements 12a and 12b. In these circumstances, the ladder 14 tips simultaneously with the gangway 12 under control of the jack 30. However, when the gangway 12 has reached its horizontal maintenance position, the body 10 of the ladder 14 is only partly unfolded, i.e. the restraining device 35 which limits the angular clearance of the body 10 of the ladder 14 has still not reached its maximum length.

The position of the ladder 14 is shown as a skeleton drawing in FIG. 4 but the drawing has been deliberately limited to the bottom wall 44 of the body 40, it being understood that the body 40 extends above the bottom wall 44.

The operator located on the ground therefore acts on the handle P2 of the body 10 of the ladder 14 to simultaneously retract the two locking pins 56 thereby enabling the body 40 to continue tipping over so long as the restraining device 35 associated with the ladder has not reached its maximum length. Once the body 40 of the ladder 14 has completely swung over, the end wall 42 of the body 40 is in a roughly horizontal position and is roughly level with the two gangway elements 12a and 12b (FIG. 3).

The operator located on the ground thereafter takes hold of the second part 45 of the ladder 14 and tips it so as to bring it more or less into line with the body 40 of the ladder 14. The ladder 14 is then operational and provides access to the platform 10 from the ground. Basically, the ladder is deployed in three phases, a first phase where it tips simultaneously with the gangway 12, a second phase where only the body 40 of the ladder 14 tips and a third phase where the second part 45 of the ladder 14 tips with respect to the body 40.

According to a second mode of operation, only the ladder 14 may be deployed towards its maintenance position, whereas the gangway 12 is held in a raised or transport position. In this event, the control jack 30 is not activated. The operator takes hold of the handle P1 to simultaneously retract the two pins 56 and separate the ladder 14 from the two gangway elements 12a and 12b. The ladder 14 thus tips in two movements. First of all, the operator makes the body 40 of the ladder swivel until the restraining element 35 associated with it reaches its maximum length. Secondly, the operator unfolds the second part 45 of the ladder by making it swivel with respect to the body 40.

According to another characteristic of the invention, the body 40 of the ladder 14 is connected to the platform 10 by an equalizing spring 70.

With reference to FIG. 5, this spring 70, is for example, mounted in a guide 72 which is hinged at 72a on a lateral wall 24a of the storage container 24, and the free end of the spring 70 which projects from the guide 72 is hinged around an axle 74 on the end of a connecting rod 76, of which the other end is hinged around an axle 78 on a cap 80 integral with the body 40 of the ladder 14.

This spring 70 works in traction and its function is to facilitate the opening of the ladder 14, notably when the gangway 12 is held in its vertical or transport position.

When the ladder 14 is folded down on the platform 10 (position A1), the spring 70 is under tension and helps to keep the ladder 14 in its raised position where it is folded down on the platform 10. The action of the spring 70 is notably beneficial when the ladder 14 is lowered by an operator independently from the two elements of the gangways 12a and 12b. In this position A1, the connecting rod 76 bears against the bottom of the cap 80, such that it is not aligned axially with the spring 70.

When the operator acts on the handle P1 to separate the ladder 14 and the gangway 12 one from the other making the ladder 14 tip, the connecting rod 76 will progressively come to be located in the axial prolongation of the spring 70 (position A3 after moving through position A2), i.e. the force of traction exerted by the spring 70 is reduced because of the reduction in its length, which helps the ladder 14 to tip over. Then, from this position A3 which roughly corresponds to a balanced position, the operator no longer has to exert force on the ladder 14, as the latter may tip over under the action of its own weight towards its lowered position. This tipping movement is braked by the spring 70 which stretches and which remains in the axial prolongation of the spring 70. When the ladder is raised, the action of the spring 70 reduces the effort required by the operator.

Naturally, the invention is in no way limited to the embodiment which has just been described. In particular, all the hinges between the platform 10 and the two elements of the gangway 12a and 12b on the one hand, and all the hinges between the platform 10 and the ladder 14 on the other, may be designed differently, given that their function is to be able to lower and raise the gangway and the ladder, with the possibility of being able to maneuver the ladder independently of the gangway.

We claim:

1. A motorized breakdown vehicle for repairing and servicing an armored vehicle, comprising:
   a chassis bearing a platform configured to accommodate maintenance and repair equipment;
   a gangway hingedly mounted on the platform allowing motion between a raised transport position and a lowered maintenance position;
   a ladder for climbing to the platform, the gangway and the ladder being hinged on the platform about a common hinge pin; and
   a releasable lock interposed between the gangway and the ladder, said lock being configured to lock the gangway to the ladder in the transport position, and to allow the gangway and the ladder to be separated from one another to maneuver the ladder independently of the gangway in the maintenance position when the releasable lock is released.

2. A motorized breakdown vehicle according claim 1, wherein the gangway is split into two elements integral with one another, and wherein the ladder is fitted between the two elements of the gangway.

3. A motorized breakdown vehicle according to claim 2, further comprising a storage container associated with each one of the two gangway elements, wherein each of the two gangway elements forms a respective front wall of the two storage containers when the gangway is in its transport position.

4. A motorized breakdown vehicle according to claim 2, further comprising a single jack for lowering and raising the gangway, said single jack having a body hinged on the platform and a connecting rod hinged on one of the two elements of the gangway.

5. A motorized breakdown vehicle according to claim 2, wherein each of the two elements of the gangway is connected to the platform to limit angular clearance of the gangway when the gangway is lowered to the maintenance position.

6. A motorized breakdown vehicle according to claim 5, wherein each of the two elements of the gangway is connected to the platform by a telescopic torque link hinged to the platform and an associated one of the two gangway elements.

7. A motorized breakdown vehicle according to claim 1, wherein the lock comprises at least one retractable pin mounted on the ladder that cooperates with at least one clasp fitted on one of the two gangway elements.

8. A motorized breakdown vehicle according to claim 7, wherein the at least one retractable pin includes two retractable pins, and wherein the motorized vehicle further comprises at least one control handle for simultaneously retracting the two retractable pins via a cable system, thereby separating the ladder from the gangway.

9. A motorized breakdown vehicle according to claim 1, wherein the ladder comprises a first part hingedly mounted on the common hinge pin allowing motion between the transport position and the maintenance position, and a second part hingedly mounted on and foldable to and away from the first part.

10. A motorized breakdown vehicle according to claim 9, wherein the first part of the ladder is connected to the platform to limit angular clearance of the first part when the ladder is in the maintenance position.

11. A motorized breakdown vehicle according to claim 9, wherein the first part of the ladder comprises two lateral walls, two end walls and a bottom wall, each lateral wall bearing a locking pin and the bottom wall bearing a control handle for each locking pin.

12. A motorized breakdown vehicle according to claim 11, wherein the bottom wall of the first part of the ladder and the gangway are coplanar when the ladder and the gangway are in the transport position.

13. A motorized breakdown vehicle according to claim 11, wherein and end wall of the first part and the gangway are substantially coplanar when the ladder and the gangway are in the maintenance position.

14. A motorized breakdown vehicle according to claim 9, wherein the first part of the ladder is connected to the platform by an equalizing spring working in traction.

15. A motorized breakdown vehicle according to claim 14, wherein one end of the spring is hinged on the platform and another end is hinged on a connecting rod that is hinged about an axle on a cap integral with the first part of the ladder.

16. A motorized breakdown vehicle according to claim 15, wherein the connecting rod bears on the cap so as to be axially misaligned with respect to the spring when the ladder is in its transport position, and wherein the connecting rod is axially aligned with the spring when the ladder is in the maintenance position.

17. A motorized breakdown vehicle for repairing and servicing an armored vehicle, comprising:

a chassis bearing a platform configured to accommodate maintenance and repair equipment;

a gangway hingedly mounted on the platform allowing motion between a raised transport position and a lowered maintenance position;

a ladder for climbing to the platform, the gangway and the ladder being hinged on the platform about a common hinge pin; and releasable locking means for locking the gangway and the ladder with one another in the transport position, and for allowing the gangway and the ladder to be separated from one another to maneuver the ladder independently of the gangway in the maintenance position when the locking means is released.

* * * * *